United States Patent [19]
Cantin et al.

[11] Patent Number: 5,604,695
[45] Date of Patent: Feb. 18, 1997

[54] ANALOG HIGH RESOLUTION LASER IRRADIATION DETECTOR (HARLID)

[75] Inventors: André Cantin, Loretteville; Maurice Gravel, Ste-Foy; Jacques Dubois, Neufchatel, all of Canada

[73] Assignee: Her Majesty the Queen, as represented by the Minister of National Defence of Her Majesty's Canadian Government, Ontario, Canada

[21] Appl. No.: 462,065

[22] Filed: Jun. 5, 1995

[51] Int. Cl.⁶ .............................. G01J 1/00; G01B 11/26
[52] U.S. Cl. .................. 356/121; 356/141.5; 250/206.2
[58] Field of Search .................................. 356/121, 141.2, 356/141.3, 141.5, 138; 250/273 R, 203.4, 206.1, 206.2

[56] References Cited

U.S. PATENT DOCUMENTS

| | | | |
|---|---|---|---|
| 4,806,747 | 2/1989 | Dunavan et al. | |
| 4,857,721 | 8/1989 | Dunavan et al. | 356/141.5 |
| 4,946,277 | 8/1990 | Marquet et al. | 250/237 R |
| 5,428,215 | 1/1995 | Dubois et al. | 356/141.5 |

Primary Examiner—Frank Gonzalez
Assistant Examiner—Amanda Merlino
Attorney, Agent, or Firm—Larson and Taylor

[57] ABSTRACT

An opto-electronic device for detecting a beam of radiation and determining the angle-of-arrival of that beam with a high degree of angular resolution. The device has a linear array of radiation detectors arranged in a plane with a shadow mask located at a predetermined height h above and parallel to that plane wherein the shadow mask has a plurality of transparent apertures separated by opaque areas. Each radiation detector in the array comprises at least one pair of individual detector elements and apertures of the shadow mask, which apertures have the same width as the detector elements, are centred directly above the area between adjacent detector elements. Signals generated by corresponding detector elements in each radiation detector are supplied, in parallel, to one channel providing a number of output channels which correspond to the number of individual detector elements in each radiation detector. The angle-of-arrival of a radiation beam emitted by a source and traversing the apertures can then be determined by output signals from the channels. This radiation beam detecting device is particularly designed for use in Laser Warning Receivers which detect, identify and locate laser sources associated with laser guided weapons.

17 Claims, 6 Drawing Sheets

ANALOG HIGH RESOLUTION LASER IRRADIATION DETECTOR (HARLID)

FIELD OF THE INVENTION

The present invention relates generally to Laser Warning Receivers (LWR) for protecting military platforms against laser guided weapons by detecting, identifying and locating laser sources associated with those weapons and in particular to receivers which can detect radiation emitted by those laser sources to accurately locate any laser threats with a high angular resolution.

BACKGROUND TO THE INVENTION

Many research laboratories and manufacturers around the world are presently involved in the development of Laser Warning Receivers (LWR) for the purpose of protecting military platforms against laser guided weapons by detecting, identifying and locating laser sources associated with those weapons. A high angular resolution in the determination of the angle-of-arrival of the laser radiation from lasers associated with those weapons is essential in order to accurately locate those sources and optimize counter measures which can be effectively deployed against such weapons. The angle-of-arrival of laser beams can be determined by various techniques which can be classified into three different groups, i.e. imaging techniques, masking techniques and time-delay techniques. The present invention pertains to the group which uses masking techniques.

Basically, the masking technique consists of mounting a shadow mask containing one or several slots above an array of detectors. The angle-of-arrival of the radiation is determined from the position where the slot(s) is(are) imaged onto the detectors. For one dimension, a simple approach is to image a single slot on an array of narrow detectors, the array being aligned parallel to the slot so that each detector covers a different sector of the area on which the image may be located. The main problem with this technique is that the number of detectors required, as well as the number of electronic channels, increases proportionally to the angular resolution wanted, thus leading to high costs in order to obtain a sufficiently high angular resolution. Using this type of technique, for example, 9 channels would be required to provide a resolution of 10 degrees within a field-of-view of 90 degrees.

U.S. Pat. No. 4,857,721 (David S. Dunavan et al) which issued on 15 Aug. 1989 describes, in a first embodiment, an apparatus for determining the direction of arrival of optical radiation wherein an elongated slit aperture is mounted above and perpendicular to elongated parallel detector strips arranged in an array extending parallel to the slit. An additional mask is located above the array and contains a number of opaque masked areas and a number of transparent areas directly above the detector strips which provide a Gray code pattern with different, complimentary, areas of alternate detector strips being masked by opaque areas. The number of transparent areas above a detector strip increase from one end of the array to the other. A very narrow bar of radiation passing through the slit aperture will lie in a transverse direction across the encoded additional mask and, as a result, be detected by particular ones of the detector strips depending on if that narrow bar of radiation falls on an opaque or transparent area of the mask. The angle at which the radiation passes through the slit aperture will determine the position at which the bar of radiation falls on the encoded mask and it will fall on different transparent areas or opaque areas as the angle is altered. Therefore, the angle-of-arrival of the radiation can be determined from which detector strips detect the narrow bar of radiation. The processing electronics consists of a differential amplifier having its (−) input connected to one detector strip and its (+) input connected to an adjacent, complimentary, detector strip with the differential amplifier output being connected, by a coupling capacitor, to a comparator which provides a binary zero or a binary one code output. With 8 detector strips, this will provide 4 digital code output channels. It is possible, with this arrangement, to achieve a resolution of 6 degrees within a field-of-view of 90 degrees from those 4 channels when 5 transparent areas of the encoded mask lie above the last detector strip and one transparent area is located above the first detector strip and covers half the length of that first strip as illustrated in U.S. Pat. No. 4,857,721.

One disadvantage of the first embodiment described in U.S. Pat. No. 4,857,721 is that it necessitates the use of a non-standard and complex configuration for the detector array. Another disadvantage is the use of an additional mask with a Gray code pattern over the detector array. U.S. Pat. No. 4,857,721 also described other embodiments in which the additional mask is not required but in which each elongated detector strip is replaced by a number of detector elements (doped regions on a silicon wafer) with each element covering an area that corresponds with a transparent area of the additional mask in the first embodiment. These other embodiments have the disadvantage in that a large number of detector elements are required, each of which must be provided with electrical connections to the processing electronics. An additional problem with existing LWRs that use masking techniques results from spatio-temporal variations of the beam intensity due to atmospheric scintillation created by atmospheric turbulence.

U.S. Pat. No. 4,946,277 (Patrice Marquet et al) which issued on 7 Aug. 1990 describes another type of laser warning detector comprising a four-quadrant detector and an associated diaphragm, formed by a transparent zone in an opaque mask, which is centred over the detector. Light rays from a source which pass through the aperture will form an image of the source on the four-quadrant detector. The offset of that image from the centre of the detector will be dependent on the angle-of-arrival of the light rays. Measurements of current generated in each quadrant of the detector can then be used to determine the angle-of-arrival of the light rays and, therefore, the location of the source. However, atmospheric scintillation formed by turbulence in the atmosphere will create errors in determining the location of a source since that scintillation will effect the position, i.e. offset, of the image on the detector.

SUMMARY OF THE PRESENT INVENTION

It is an object of the present invention to provide an opto-electronic device for determining the angle-of-arrival of optical radiation with a high angular resolution wherein a single shadow mask is located above a linear array of photodetector elements with only two electronic channels being required to determine the angle-of-arrival in a single plane.

It is a further object of the present invention to provide an opto-electronic device for determining the angle-of-arrival of optical radiation with a high angular resolution that is designed to minimize the effects of atmospheric scintillation which results in variations in intensity of the incident optical radiation.

An opto-electronic device for detecting a beam of radiation and determining the angle-of-arrival of said beam with a high degree of angular resolution, according to one embodiment of the present invention, comprises a first linear array of radiation detectors arranged in a plane with a shadow mask being located at a predetermined height h above and parallel to said plane, the shadow mask having a plurality of transparent apertures separated by opaque areas arranged in a second linear array; wherein each radiation detector has at least one pair of individual detector elements and each aperture has substantially the same width, along the length of an array, as an individual detector element with each inner aperture in the second linear array being centred, along its width, directly above the area between adjacent detector elements of each radiation detector; the device having means for adding together signals generated by corresponding detector elements of the radiation detectors in separate channels and a means for determining the angle-of-arrival of said beam from output signals of said channels.

BRIEF DESCRIPTION OF THE DRAWINGS

The invention will now be described in more detail with reference to the accompany drawings, in which.

DETAILED DESCRIPTION OF THE PREFERRED EMBODIMENT

A High Angular Resolution Laser Irradiation Detector (HARLID) according to a first embodiment of the present invention is illustrated in FIGS. 1, 2, 3A and 3B. This first embodiment of the invention uses analog signals to determine the angle-of-arrival of a laser beam in a single plane, i.e. a 1-dimension (1-D) HARLID. That detector can detect radiation from a source that arrives at an angle, within a certain range of angles, to that single plane but can only determine the angle-of-arrival for that one plane. However, measurements of angles-of-arrival in other planes can be made using two of the 1-dimension HARLIDs arranged at right angles to each other in an orthogonal configuration to form a 2-dimension HARLID.

Figure 1:
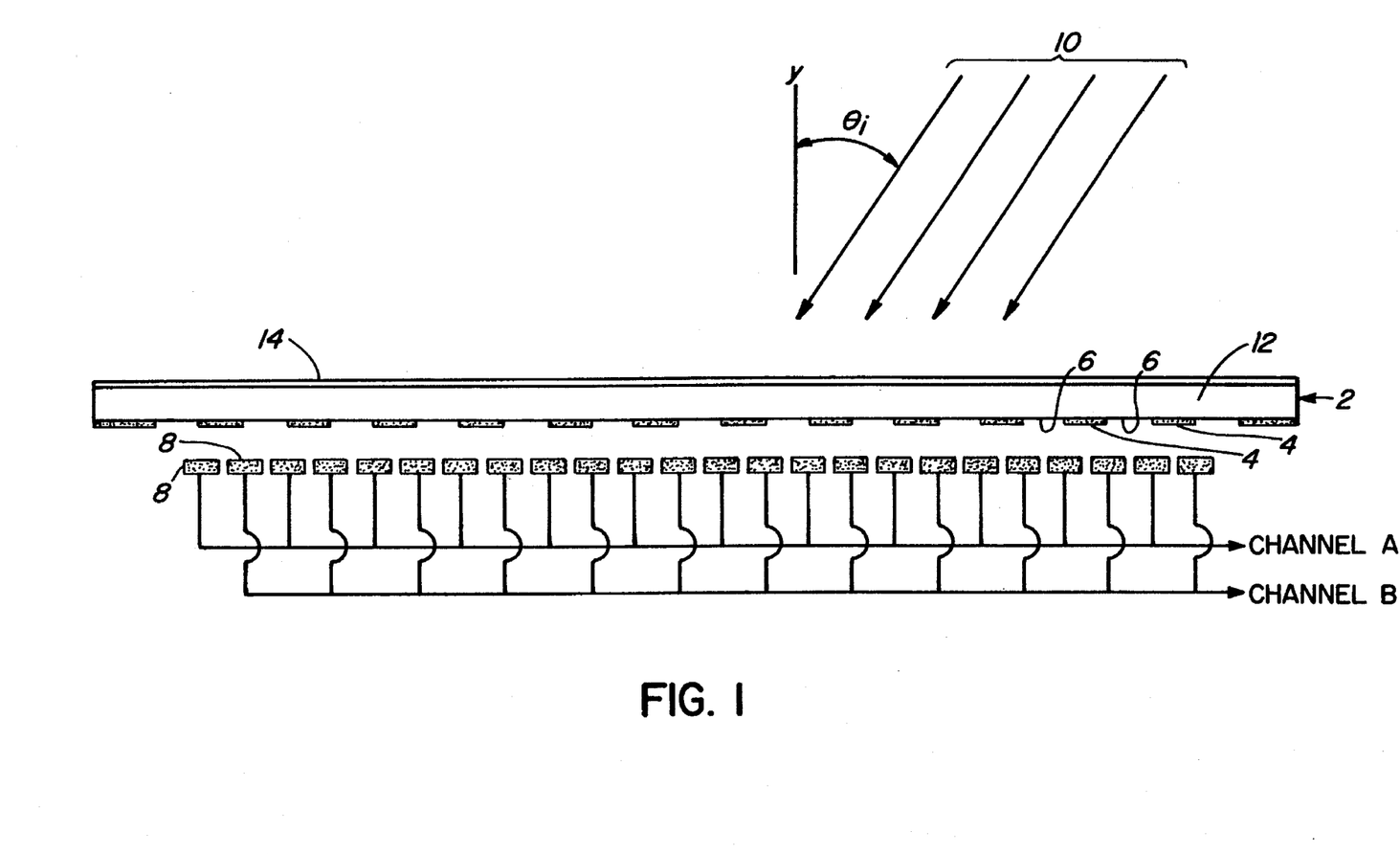
FIG. 1 is a schematic diagram of a 1-dimension High Angular Resolution Laser Irradiation Detector (HARLID) in cross-section according to one embodiment of the present invention.
Figure 2:
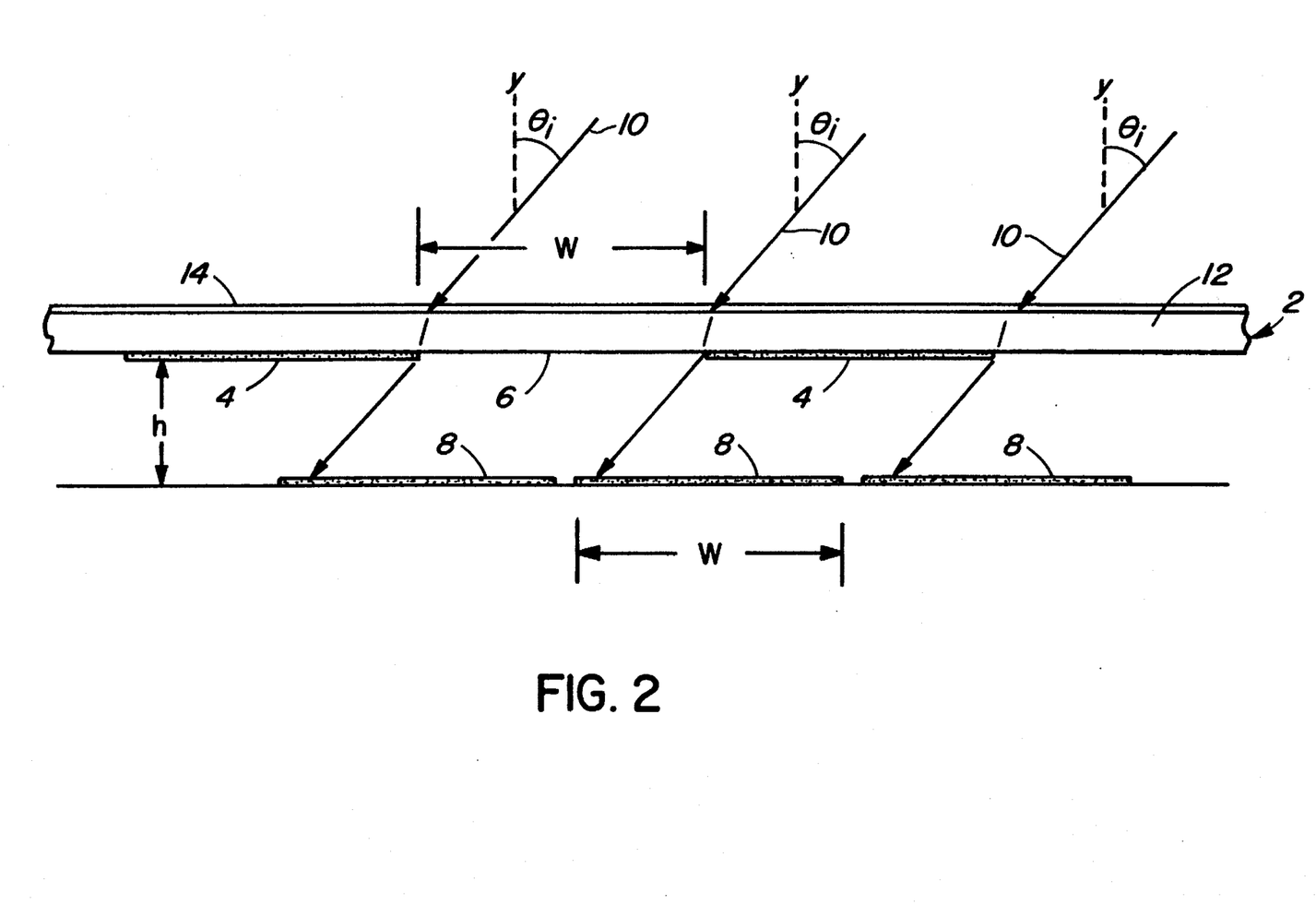
FIG. 2 is a partial view of a section of FIG. 1, enlarged to illustrate more clearly the operation of that detector.
Figure 3A:
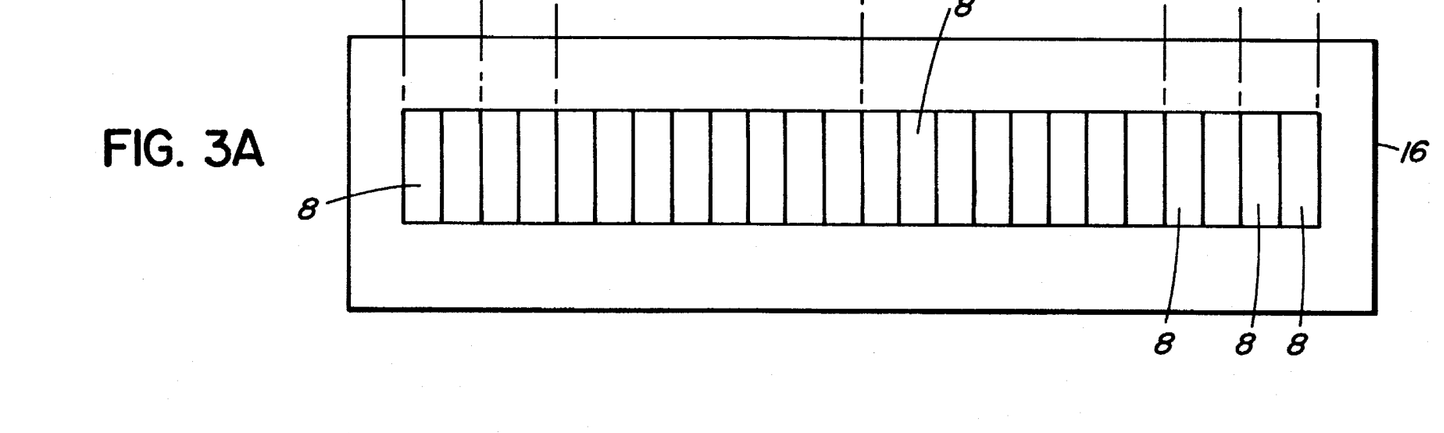
FIG. 3A is a top view of a detector array in the HARLID of FIG. 1 when located in an enclosure.
Figure 3B:
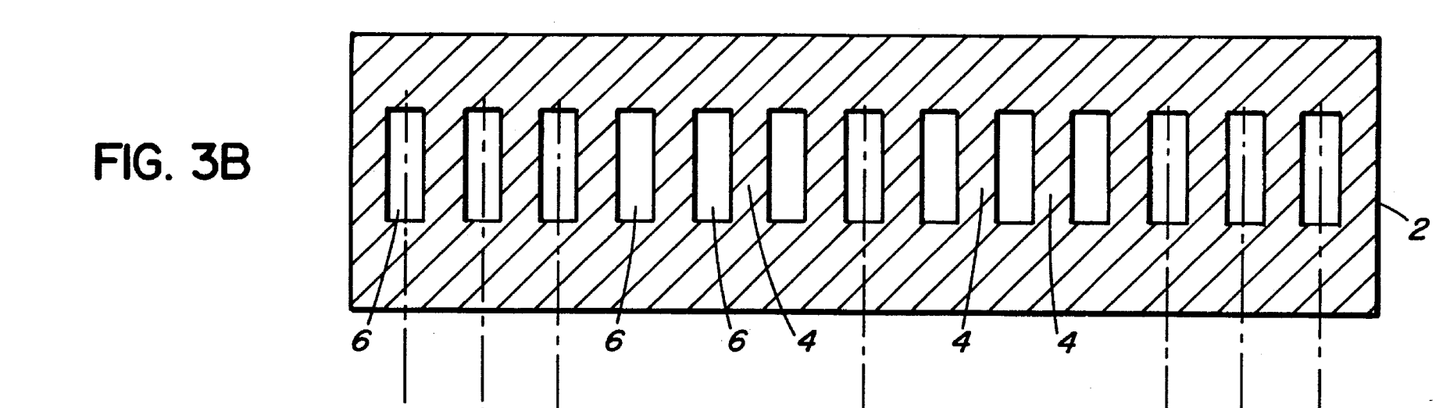
FIG. 3B is a top view of a shadow mask in the HARLID illustrated in FIG. 1.

The 1-dimension HARLID shown in FIG. 1 comprises a shadow mask formed by (N+1) transparent apertures 6 separated by opaque areas 4 with that shadow mask being located above a linear array of 2N photodetector elements 8. In the embodiment shown in FIG. 1, there are 13 transparent areas in the shadow mask which are located directly above, at a height h as indicated in FIG. 2, a linear array of 24 photodetector elements 8. The transparent areas or apertures 6 are in the form of slots that have the same width w as a photodetector element 8 with the opaque bars 4 between the slots 6 having essentially the same width as the slots along the length of the array of detector elements. Except for end slots, each transparent slot 6 of the shadow mask is centred, along its width w, over the space between two detector elements 8 which is best illustrated in the enlarged view of FIG. 2 wherein only two opaque areas or bars 4, separated by a transparent area 6, are shown above several detector elements 8. FIG. 1 shows a linear array of 24 detector elements 8 with 13 transparent slots 6 of the mask arranged so that the end slots are centred over an outer edge of an end detector element and each of the remaining slots are centred over the space between adjacent detector elements 8. The shadow mask 2 can be formed by depositing opaque radiation absorbing material onto an Anti-Reflection (AR) coated glass window 12 except for areas where the transparent slots 6 are located, thus forming opaque bars 4 between slots 6. The transparent slots 6 have a length, perpendicular to the long axis of the array, at least equal to that of a photodetector element 8. The slots 6 could actually be longer in length than the photodetector elements 8 in order to detect a laser beam incident on the detector at an angle other than in a plane perpendicular to the plane in which the array is located and which is parallel to the array. A top view of a 24 element detector array in an enclosure 16 is shown in FIG. 3A with an associated shadow mask 2 having 13 transparent slots 6 being shown in FIG. 3B. The opaque areas of the shadow mask are shown as cross-hatched areas in FIG. 3B.

Alternate detector elements 8, as shown in FIG. 1, are connected together in parallel so as to produce two output channels A and B with signals from 12 photodetector elements being added together for each channel. This interdigitation of the 2N, i.e. 24 in FIG. 1, photodetector elements 8 in the linear array reduces the influence of spatio-temporal variations of an incident laser beam's intensity resulting from the effects of atmospheric scintillation. The direction-of-arrival of an incident laser beam 10 at an angle $\theta_i$ from the vertical axis y is determined by processing the signals from the two output channels A and B. By trigonometry functions, the angle $\theta_i$ can be determined according to the equation $$\tan \theta_i = \frac{w}{2h} \cdot \frac{A-B}{A+B} \qquad (1)$$

where $\theta_i$ is the incident angle-of-arrival of the laser beam 10;

h is the height of the shadow mask above the linear array of photodetectors 8;

w is the width of a photodetector element 8 and a transparent slot 6; and

A and B are the sum of signals from the N photodetector elements for each channel. This sum represents a normalized signal independent of the angle-of-arrival of the beam and needs no amplitude calibration.

A module consisting of a shadow mask and of a linear array of photodetectors as shown in FIG. 1 provides a field-of-view of $+\tan^{-1}(w/2h)$ to $-\tan^{-1}(w/2h)$. A shadow mask and associated detector array for a 1-D HARLID with N=12 and with h=w/2 provides a field of view of +45° to −45°. Prototype detector assemblies, similar to FIG. 1, mounted in a rectangular 36-pin base and covered with a flat lid containing a visible near infrared (VNIR), anti-reflection (AR) coated, window provided an angular resolution of 3 degrees. Two of these 1-D HARLID arrangements can be mounted at right angles to each other in order to provide an omni-directional detector above a plane.

Figure 4:
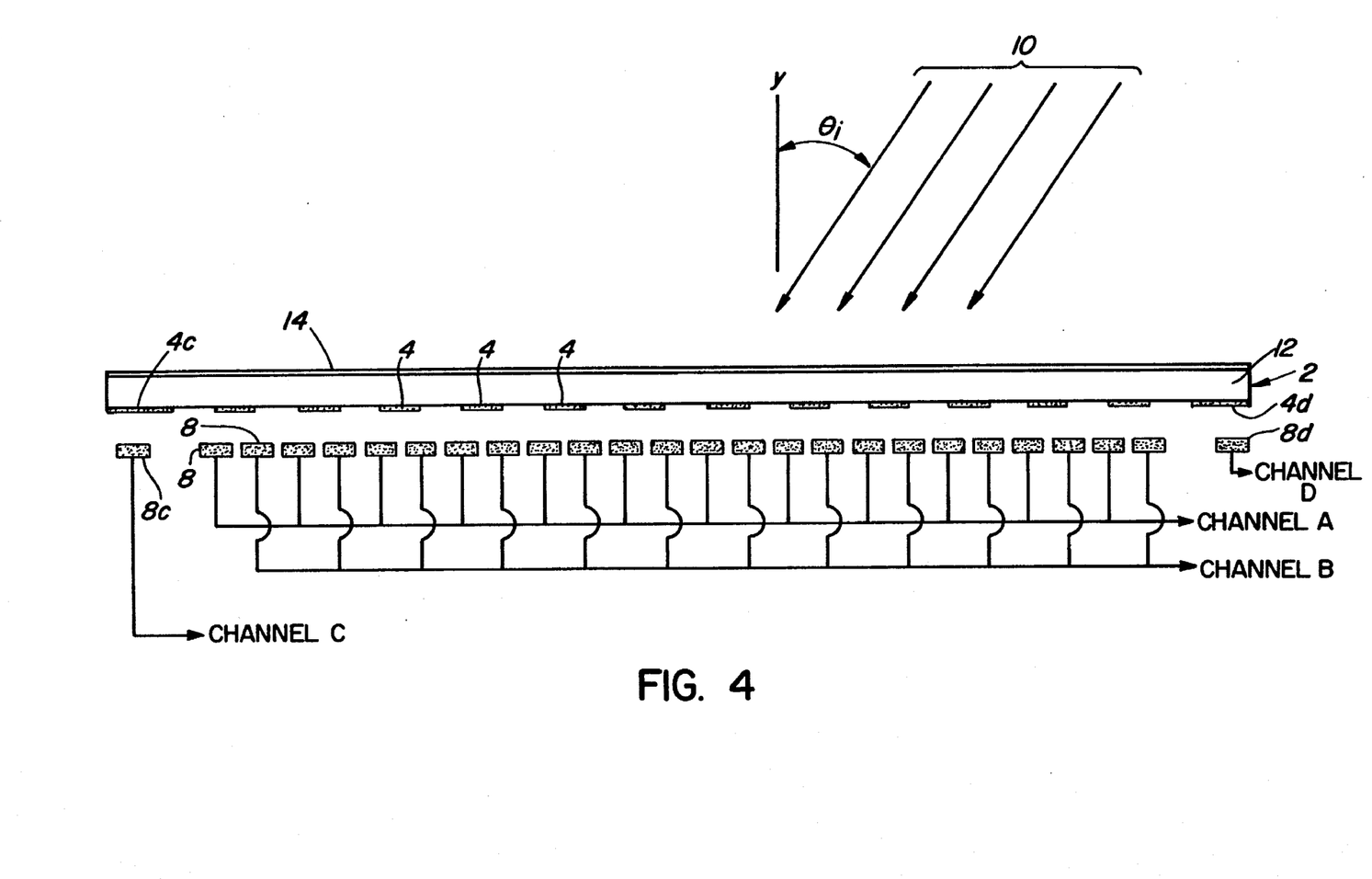
FIG. 4 is a schematic diagram of a modification of the HARLID shown in FIG. 1 according to a further embodiment of the present invention.

FIG. 4 shows a modification to the HARLID illustrated in FIG. 1 which is a more skillful approach to the present invention. In this further embodiment, an extra detector element is located at either end of the linear array, which detectors are spaced from the ends of the linear array elements by about the width of one of the detector elements. These additional elements are identified by the number 8d at the right of the array in FIG. 4, whose output is applied to an additional Channel D, and by the number 8c at the left of the array in FIG. 4, whose output is applied to an additional Channel C. Additional opaque areas of the shadow mask are located above the additional detectors. These additional opaque areas extend by about half the width of a detector element towards the normal linear array of photodetector elements 8. The opaque area 4c is located above the additional detector 8c and opaque area 4d is located above the additional detector 8d. These additional detectors 8c and 8d act as reference detectors to define a predetermined field-of-view and to provide guard lines to reject sources of radiation located outside of a field-of-view of-view of interest. It should be noted that reference Channels C and D are not actually used to determine an angle-of-arrival from a radiation source but only to reject sources of radiation located outside the field-of-view of interest. It should be further noted that HARLIDs can be used in cascade to increase the dynamic range of operation by covering their AR-coated windows 12 with appropriate neutral density filters 14 as indicated in FIGS. 1, 2, and 4.

Figure 5:
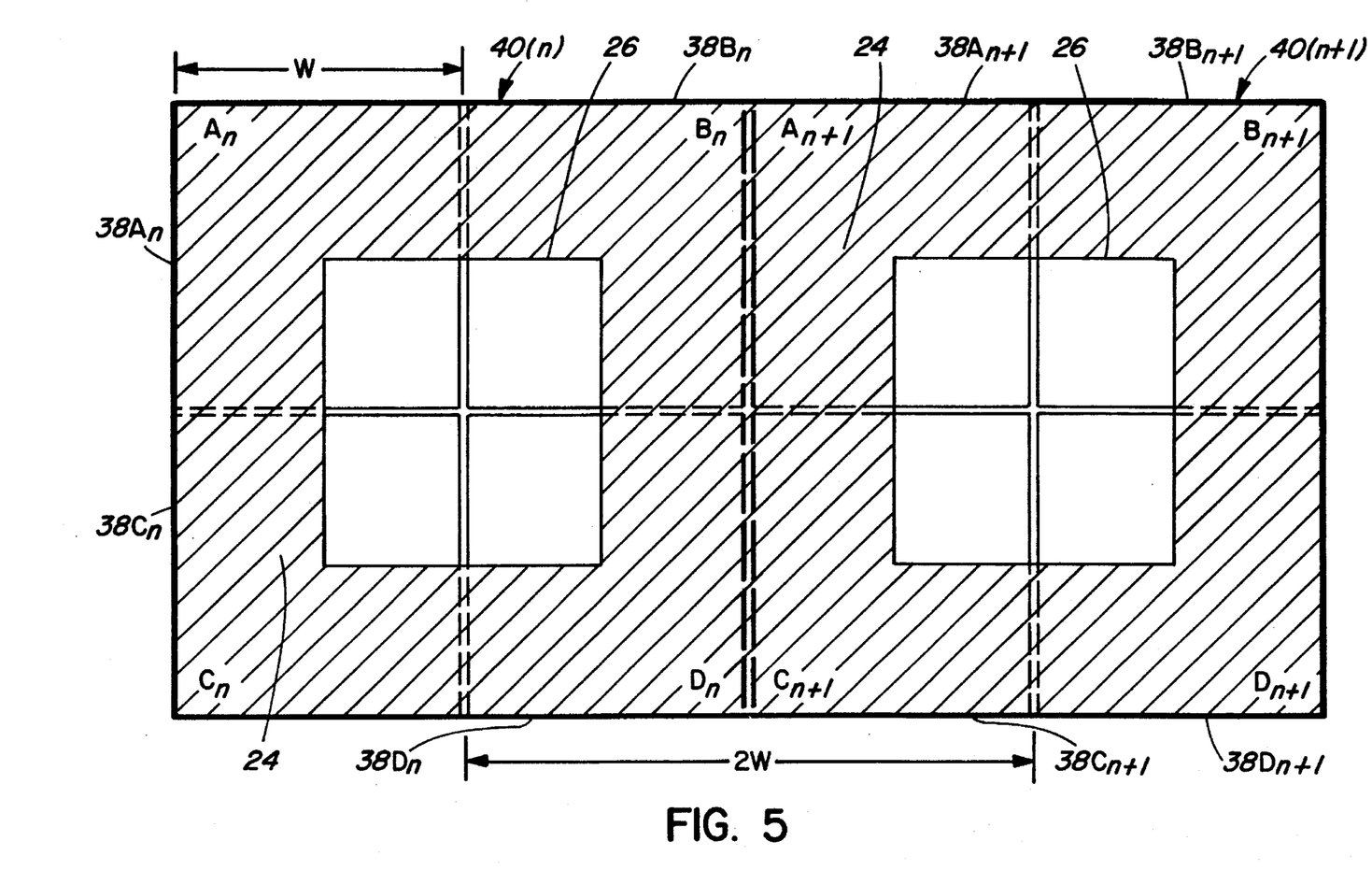
FIG. 5 is a schematic diagram (top view) of a portion of a 2-dimension HARLID according to another embodiment of the present invention.
Figure 6A:
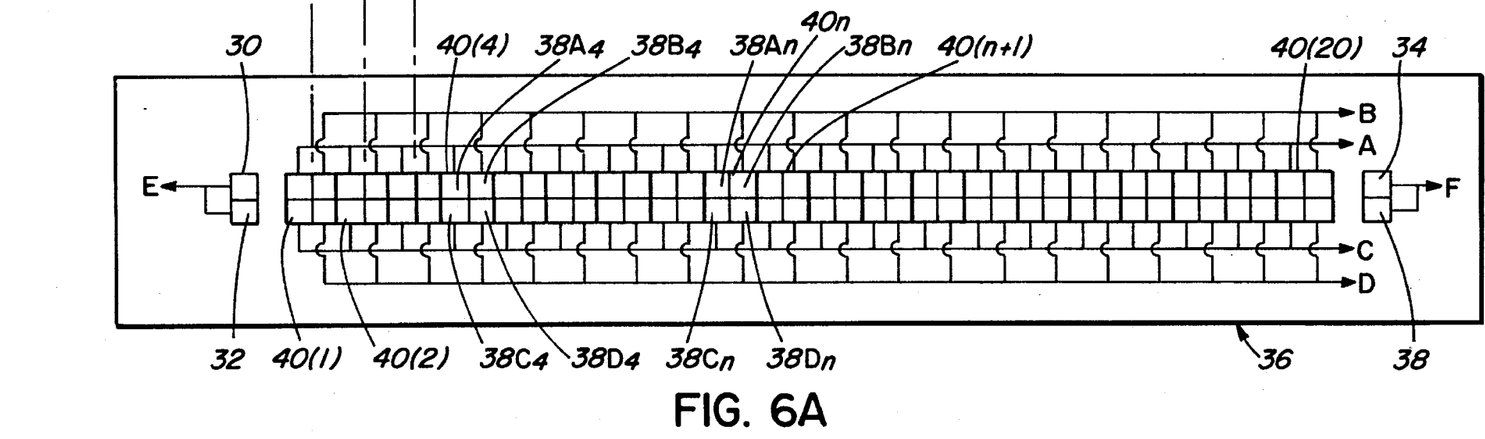
FIG. 6A is a top view of a detector array in the HARLID shown in FIG. 5 when located in an enclosure.
Figure 6B:
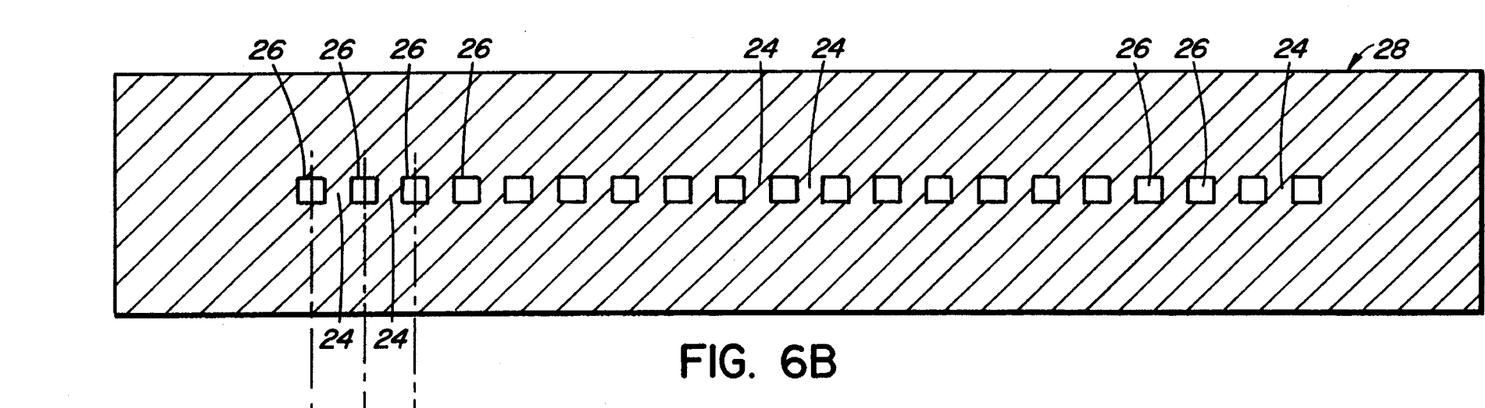
FIG. 6B is a top view of a shadow mask in the HARLID illustrated in FIG. 5.

Measurement of angles-of-arrival in two dimensions, resulting in an omni-directional detector above a plane, can be made by using two 1-dimension HARLIDs in an orthogonal configuration as previously mentioned. However, a further embodiment of the invention illustrated in FIGS. 5, 6A and 6B provides a 2-dimension HARLID for omni-directional detection. This 2-dimension (2D) HARLID is formed by replacing each pair of detectors in FIG. 1, one of the pair being connected to Channel A and the other to Channel B, by a four-quadrant detector 40(n) as shown in FIGS. 5 or 6A, "n" identifying one of the quadrant detectors in an array of N quadrant detectors. Each quadrant detector 40(n) contains 4 separate detector elements $38A_n$, $38B_n$, $38C_n$ and $38D_n$ (see FIGS. 5 or 6A) with each detector element having a width w extending along the longest direction of the linear array. The detector elements in FIG. 5 are square with each side having a dimension w. A shadow mask 28 with N transparent apertures 26 is located at a height h (similar to that shown in FIG. 2) above the linear array of N quadrant detectors. Each aperture 26 is centred over each quadrant detector 40(n) and has sides equal in width w to the width of a single detector element 38(n). The apertures 26 are located a distance 2w apart which results in each one of the apertures 26 being centred over each quadrant detector 40(n). The space 24 between the apertures 26 is opaque as illustrated by cross-hatched lines in FIGS. 5 and 6B. FIG. 6B illustrates a shadow mask 28 having N apertures wherein N=20. Since each of the apertures 26 will be centred over one of the N quadrant detectors 40(n) consisting of 4 detector elements ($38A_n$, $38B_n$, $38C_n$ and $38D_n$), there will be a total of 4N, i.e. 80, detector elements in the linear array of detectors 36.

Referring to FIG. 6A, all of the detector elements $38A_n$ are connected together in parallel to an output Channel A and all of the detector elements $38B_n$ are connected together in parallel to an output Channel B. Similarly, all the detector elements $38C_n$ of the quadrant detectors 40(n) are connected together in parallel to an output Channel C and all the detector elements $38D_n$ are connected together in parallel to an output Channel D. Therefore, all of the detector elements $38A_n$, $38B_n$, $38C_n$ and $38D_n$ are interdigitated to provide four channel outputs where $$\text{Channel } A = \sum_{n=1}^{N} A_n;$$

$$\text{Channel } B = \sum_{n=1}^{N} B_n;$$

$$\text{Channel } C = \sum_{n=1}^{N} C_n;$$

and $$\text{Channel } D = \sum_{n=1}^{N} D_n;$$

n identifying one of the detectors with N being the total number of quadrant detectors 40. These multi-sensor elements connected in parallel average the incident signals and minimize fluctuations due to atmospheric scintillation. Each channel output signal is equal to the sum of the signals from all of individual detector elements 38 associated with that channel. In a manner similar to that from which equation (1) was developed, the azimuth ($\theta_{az}$) and elevation ($\theta_{el}$) angles-of-arrival of a laser beam incident on the detector shown in FIGS. 5, 6A and 6B are related to that detector A, B, C and D channel outputs by the following equations:

$$\tan \theta_{az} = \frac{w}{2h} \cdot \frac{(A+C)-(B+D)}{A+B+C+D} \quad (2)$$

and $$\tan \theta_{el} = \frac{w}{2h} \cdot \frac{(A+B)-(C+D)}{A+B+C+D} \quad (3)$$

where h is the height of the shadow mask above the linear array of quadrant photodetectors and w is the width of each individual square photodetector element in one of the quadrant detectors. When h=w/2, the geometry shown in FIGS. 6A and 6B will accommodate ±45° of azimuth and of elevation angle-of-arrivals for an incident laser beam. The sum of signals A, B, C and D represents a normalized signal independent of the angle-of-arrival of the beam and needs no amplitude calibration.

FIG. 6A shows a top view of a linear quadrant detector array for N=20 and FIG. 6B shows a top view of the associated shadow mask for that array provided with 20 apertures. Since each quadrant detector contains 4 detector elements, a total of 80 photodetector elements is required for this linear array. A prototype module of that 80-element array mounted in a rectangular 86-pin base with the module being closed by a flat lid containing an VNIR, AR-coated, window provided an angular resolution of 3° in azimuth and 15° in elevation.

The addition of two extra pairs of detector elements, one pair at each end of the linear array, would define a predetermined field-of-view and provide guard lines to reject sources of radiation located outside the field-of-view of interest. This is illustrated in FIG. 6A by the additional detector elements 30 and 32 at the left end of the array whose signals are applied together to a reference Channel E and by the additional detector elements 34 and 38 at the right end of the array, signals from 34 and 38 being applied to a reference Channel F. The shadow mask 28 would accommodate these additional detector elements located at each end of the array (FIG. 6B) and spaced from the ends of the array by a distance equal to the width of one detector element. Opaque areas of the shadow mask are shown by cross-hatched lines in FIGS. 5 and 6B.

A number of the 2-D HARLID embodiments illustrated in FIGS. 5 to 6B can be used in cascade, similar to the previously described 1-D embodiments, to increase the dynamic range of operation by applying appropriate neutral density filters (not shown in FIGS. 5 to 6B) to the AR-coated windows for each module in the cascade arrangement.

Various modifications may be made to the preferred embodiments without departing from the spirit and scope of the invention as defined in the appended claims.

The embodiments of the invention in which an exclusive property or privilege is claimed are defined as follows:

1. An opto-electronic device for detecting a beam of radiation and determining the angle-of-arrival of said beam with a high degree of angular resolution, the device comprising a first linear array of radiation detectors arranged in a plane with a shadow mask being located at a predetermined height h above and parallel to said plane, the shadow mask having a plurality of transparent apertures separated by opaque areas arranged in a second linear array; wherein each radiation detector has at least one pair of individual detector elements and each aperture has substantially the same width, along the length of the second linear array, as an individual detector element, with inner apertures in the second linear array each being centered, along the width of said inner apertures, directly above the area between adjacent detector elements of each radiation detector; the device having means for adding together signals generated by corresponding detector elements of the radiation detectors in separate channels and a means for determining the angle-of-arrival of said beam from output signals of said channels.

2. An opto-electronic device as defined in claim 1, wherein each radiation detector comprises a single pair of adjacent, rectangular shaped, detector elements and the apertures are rectangular shaped with the length of each aperture, perpendicular to the length of an array, being at least equal to the length of the longest side of the rectangular shaped detector elements with each end aperture in the second linear array being centred, along its width, directly above an outer edge of an end radiation detector in the first linear array and wherein alternate detector elements are connected to separate channels to provide an output signal in two separate channels.

3. An opto-electronic device as defined in claim 2, wherein at least one reference radiation detector element is located adjacent an end of the first linear array, that element being associated with an end aperture in the shadow mask and connected to a reference channel.

4. An opto-electronic device as defined in claim 3, wherein one of said reference radiation detector elements is located adjacent each end of the first linear array.

5. An opto-electronic device as defined in claim 4, wherein a second similar linear array of radiation detectors is arranged in said plane at right angles to the first linear array with an associated shadow mask being located above said second similar linear array.

6. An opto-electronic device as defined in claim 1, wherein the shadow mask is an anti-reflection coated glass window onto which opaque radiation absorbing material is deposited to form said opaque areas.

7. An opto-electronic device as defined in claim 3, wherein the shadow mask is an anti-reflection coated glass window onto which opaque radiation absorbing material is deposited to form said opaque areas.

8. An opto-electronic device as defined in claim 6, wherein a neutral density filter is applied to the window and a number of said devices with different density filters are located in a cascade arrangement to increase the dynamic range of operation.

9. An opto-electronic device as defined in claim 7, wherein a neutral density filter is applied to the window and a number of said devices with different density filters are located in a cascade arrangement to increase the dynamic range of operation.

10. An opto-electronic device as defined in claim 1, wherein each radiation detector comprises four adjacent rectangular detector elements of equal size forming a quadrant detector with a first two of these four detector elements being located adjacent to each other at one side of the first linear array and another two of those four elements being located adjacent to each other and the first two at an opposite side of the first linear array with each aperture of the shadow mask being centred above a centre of each quadrant detector.

11. An opto-electronic device as defined in claim 10, wherein each aperture of the shadow mask has the same shape and size as one of the detector elements and each of the detector elements in each quadrant detector is connected to a separate channel with corresponding elements in each quadrant detector being connected to the same channel providing an output signal in four separate channels.

12. An opto-electronic device as defined in claim 11, wherein at least one reference radiation detector element is located adjacent an end of the first linear array, that element being associated with an end aperture in the shadow mask and connected to a reference channel.

13. An opto-electronic device as defined in claim 12, wherein at least one of said reference radiation detector elements is located adjacent each end of the first linear array.

14. An opto-electronic device as defined in claim 11, wherein the shadow mask is an anti-reflective coated glass window onto which opaque radiation absorbing material is deposited to form said opaque areas.

15. An opto-electronic device as defined in claim 12, wherein the shadow mask is an anti-reflective coated glass window onto which opaque radiation absorbing material is deposited to form said opaque areas.

16. An opto-electronic device as defined in claim 14, wherein a neutral density filter is applied to the window and a number of said devices with different density filters are located in a cascade arrangement to increase the dynamic range of operation.

17. An opto-electronic device as defined in claim 15, wherein a neutral density filter is applied to the window and a number of said devices with different density filters are located in a cascade arrangement to increase the dynamic range of operation.

* * * * *